United States Patent Office 2,811,619
Patented Oct. 29, 1957

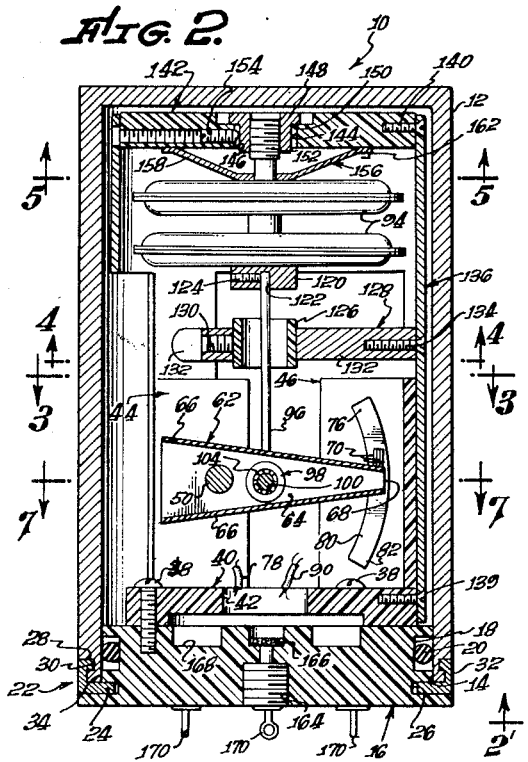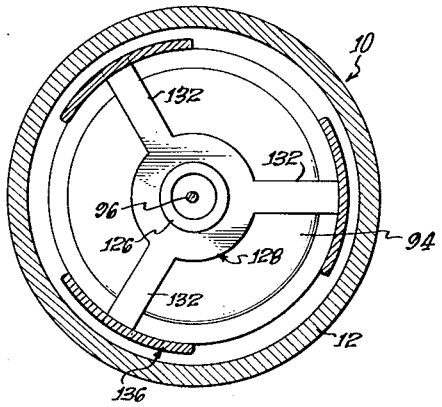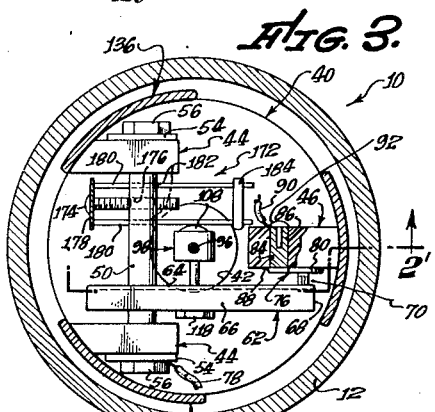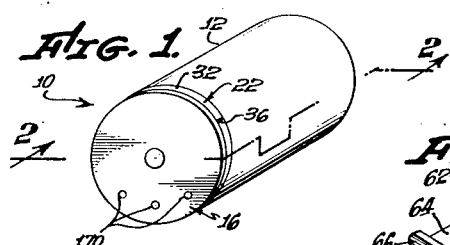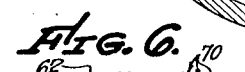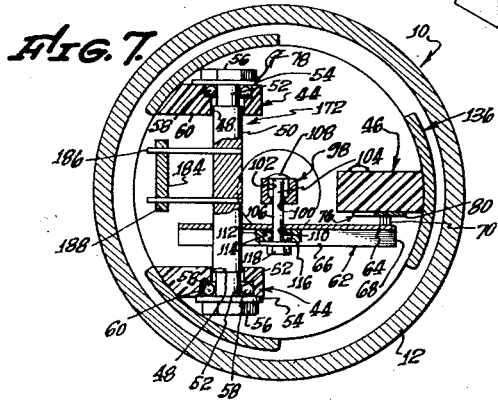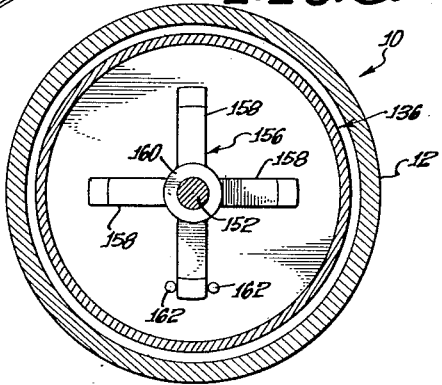

2,811,619

PRESSURE RESPONSIVE RESISTOR

Marlan E. Bourns, Marvin E. Harrison, and Robert M. Whitehorn, Riverside, Calif.; said Harrison and said Whitehorn assignors to Bourns Laboratories, Inc.

Application January 10, 1955, Serial No. 480,744

8 Claims. (Cl. 201—48)

The present invention relates to new and improved pressure responsive resistors. Certain of the subject matter disclosed herein is related to the subject matter disclosed in the co-pending application Serial No. 394,974 filed in the U. S. Patent Office November 30, 1953.

As the field of guided missiles and other modern structures of a related category expands there is a constantly increasing need for pressure responsive instruments such as variable resistors of increased accuracy and effectiveness of operation. Pressure responsive instruments such as are disclosed in the noted co-pending application have been, in general, very favorably received for a variety of applications. Unfortunately however, gradually increased requirements with respect to accuracy have made it necessary to develop new and improved devices of the class described. It is a general object of the instant disclosure to teach the production of such new and improved pressure responsive instruments. A related general object is to accomplish the production of devices of the class indicated by comparatively simple means with the result that units of the instant invention may be easily produced at a comparatively low cost with a minimum of difficulty. Further objectives of this disclosure, as well as many advantages of it, are it is thought, best explained in connection with the remainder of this specification setting forth the details of this invention.

This invention is of course completely summarized or defined by the appended claims forming a part of this specification. From these claims it will be seen that many individual features of pressure responsive instruments of the invention have separate utility in other related devices besides the complete units herein disclosed, although it is thought that all of these features must necessarily be employed in conjunction with one another in the production of pressure sensitive instruments having the desired qualities indicated briefly in the preceding discussion. Thus the features of the invention are considered to, in effect, cooperate in a synergistic manner when used together, enabling the units of the invention to have superior properties to related devices presently being marketed.

The invention may be summarized as required by the Rules of Practice of the U. S. Patent Office in patent cases as being concerned with pressure responsive resistors including a generally cylindrical housing having an open end formed therein; a lid mounted within said open end; groove means formed in both said lid and said housing adjacent to said open end; a resilient locking ring having a transverse opening formed therein, and interior projections formed thereon positioned about these grooves with said projections engaging these grooves so as to effectively lock the lid and the housing with respect to one another; cage means attached to said lid and projecting into the interior of the housing, said cage means including a bellows support upon which a rotatable nut-like member is mounted, and upon which means are mounted for preventing rotation of this nut-like member; bellows means held by said nut-like member; spring means normally urging said bellows means away from the bellows support; shaft means projecting from said bellows through guide means secured to said cage means, said guide means serving as a stop means to limit the expansion of said bellows means; pivot means mounted on said lid interiorly of said housing; means including a rigid arm held by said pivot means so as to be capable of movement with respect thereto; bearing means located on said arm at a point thereof removed from the axis of rotation of said arm; means connecting said bearing means to an extremity of said shaft remote from said bellows means; means attached to said lid interiorly of said housing for supporting an electrical resistance element; a resistance element mounted on said means; a plurality of resilient flexible contact members attached to said rigid arm adjacent to said resistance element so as to engage this element; and dynamic balancing means serving to dampen unwanted vibration attached operatively to said rigid arm, such dynamic balancing means including resilient arm means and weight means mounted on said resilient arm means.

Unfortunately a summary of the invention of the type set forth in the preceding paragraph to be sufficient to appraise those skilled in the art as to the complete nature of the subject matter of this specification has to be far too detailed to actually indicate the simplicity of the inventive concept involved. Therefore reference is made to the appended claims in which various aspects of the invention are summarized and defined in detail. The precise nature of pressure responsive instruments as herein disclosed is best more fully understood with reference to the accompanying drawings in which:

Fig. 1 is an isometric view of a pressure sensitive resistor of the invention;

Fig. 2 is a cross-sectional view taken along line 2—2 of Fig. 1, the offset portion of line 2—2 in this figure indicating that part of this sectional view is taken along line 2'—2' of Fig. 3;

Fig. 3 is a cross-sectional view taken at line 3—3 of Fig. 2;

Fig. 4 is a cross-sectional view taken at line 4—4 of Fig. 2;

Fig. 5 is a cross-sectional view taken at line 5—5 of Fig. 2;

Fig. 6 is an isometric view showing contact means employed with the invention; and Fig. 7 is a cross-sectional view of a modified resistor of the invention taken along the general direction of line 7—7 of Fig. 2.

For convenience of illustration the actual dimensions of many of the parts employed in pressure sensitive resistors as herein disclosed have in many cases been altered without changing the essential mode of function of these same parts. Also in all figures of the drawings like numerals are used to designate like parts.

In Figs. 1 through 5 of the drawings a pressure sensitive variable resistor 10 is shown as incorporating a generally cylindrical metal housing 12 having an open end 14 within which there is disposed a lid 16 of a non-conductive material. This lid 16 contains an external groove 18 within which there is disposed a common O-ring 20 formed of an elastomeric material. This O-ring is, as is best seen in Fig. 2 of the drawings, held tightly within the housing 12 and the lid 16 so as to form a very effective seal between these two members.

The holding action of the O-ring 20 against movement of the lid 16 with respect to the housing 12 is considered insufficient for practical purposes. For this reason a sealing band 22 is preferably employed with the invention in such a manner as to securely hold the lip 16 with respect to the housing 12. This band 22 has a first internal flange 24 which is normally carried within a groove 26 located on the outside of the lid 16 and a second internal flange 28 which is designed to be carried in another groove 30 formed on the outside of the housing 12 immediately adjacent to the open end 14 of this housing. Preferably the center portion 32 of the band 22 is held within a small recess 34 formed on the housing 12 between the grooves 30 and 26 so that the entire resistor 10 has, when viewed, a substantially smooth appearing exterior surface. The sealing band 22 is preferably formed of a highly resilient metal in much the manner in which a common split piston ring is manufactured so as to include a transverse opening 36 which enables the sealing band 22 to be readily snapped into the position shown.

When the sealing band 22 is used in the manner illustrated it is exceedingly efficient for the purpose intended forming a very positive lock against unwanted movement of the housing 12 and the lid 16 with respect to one another. Further the sealing band 22 possesses the additional commercial advantage that it is exceedingly difficult to remove from the resistor 10, and thus forms an effective means to thwart unwanted tampering with this resistor.

Attached to the lid 16 within the housing 12 by means of screws 38 is a mounting member 40 formed of a non-conductive resinous material. As is best seen in Figs. 2 and 3 of the drawings this mounting member includes a centrally located opening 42 formed therein and upstanding bearing supports 44, and an upstanding resistor support 46. These supports 44 and 46 are preferably molded integrally with the mounting member 40 so as to in effect constitute extensions of this mounting member. The bearing supports 44 each possess aligned openings 48 of the category shown in detail in Fig. 7 of the drawings which are designed to carry a shaft 50 having ends 52 of reduced diameter passing through washers 54 on the sides of the supports 44 remote from one another. Threaded nuts 56 are secured to these ends 52. Ball bearings 58 are located around the ends 52 within grooves 60 formed within the supports 44 for the obvious purpose of carrying the shaft 50 in such a manner that it may be easily rotated with respect to these supports 44.

Secured to the shaft 50 is a rigid contact arm 62 having the general shape of a U-shaped channel including a center section 64 of gradually decreasing width to which there are attached at right angles sides 66. It is best seen from examination of Fig. 2 of the drawings that this contact arm 62 is in essence pointed away from the shaft 50 in the general direction of the resistor support 46, where it terminates in an end 68 appearing as it is shown in Fig. 6 of the drawings. To this end there are attached a plurality of very flexible resilient metal contacts 70, each including a curved ridge 74 and a pointed end 72 formed immediately adjacent thereto so as to project generally away from the contact arm 62. With the invention these metal contacts 70 are employed so as to have the curved ridges 74 bearing at all times against a resistance element 76 secured to the resistor support 46 in order to establish electrical communication from this resistance element back through the contact arm 62 and the shaft 50 to a wire 78 secured to one of the washers 54. It is considered obvious that for electrical communication to be established in this manner that both shaft 50 and the contact arm 62 must be formed of an electrically conductive material.

The resistance element 76 employed with the invention preferably has the shape of a sector of a circle having its center located coincident with the center of rotation of the shaft 50. Further this resistance element 76 is mounted upon the resistor support 46 in such a manner that all portions of it contacted by the metal contacts 70 are located within the same plane transverse to the axis of rotation of the shaft 50.

The precise structure of the resistance element 76 employed with the invention is best illustrated in Fig. 3 of the drawings. Here it is shown that this element is a very thin layer 80 of a resistance composition of the broad category frequently used in printed circuit work disposed directly upon the resistor support 46 in the same manner in which printed circuit resistance means are commonly secured to any non-conductive supports. One novel feature of the invention lies in the method in which electrical contact is made to the resistance element 76. Within the support 46 immediately adjacent to the ends 82 of the resistance element 76 there are formed two openings 84 projecting entirely through this resistor support. Within these openings there are secured by a conventional means, such as an adhesive, metal inserts 86 having surfaces 88 coincident with the surface of the support 46 upon which the resistance element 76 is mounted. Thus with this construction the resistance element 76 merely overlays the surfaces 88 so as to be attached thereto in the same manner in which it is attached to the support 46. Thus with this construction the metal inserts 86 serve as end terminals for the resistance element 76 so that two wires 90 may be electrically connected to this resistance element 76 through the use of screws 92 secured to these inserts without being located in the same general plane transverse to the axis of rotation of the shaft 50 as the metal contacts 70. With this construction there is effectively no danger of the terminal means employed interfering with the rotation of the contact arm 62.

With the present invention such rotation takes the form of what may be termed reciprocating or oscillating motion designed to move the metal contacts 70 between the ends 82 of the resistance element 76 so that the entire resistor 10 may be operated as a common potentiometer. The actual movement of the arm 62 is caused by the expansion or contraction of bellows 94 which are connected to the arm 62 by means of a rod-like shaft 96 capable of a limited amount of bending motion. This shaft carries at its extremity adjacent to the arm 62 a cylindrical bearing carrier 98 having formed therein a shaft opening 100 and an internal groove 102 designed to hold bearing rollers 104 which in turn carry a connecting shaft 106. This connecting shaft is provided with a headed extremity 108 serving to retain the rollers 104 within the groove 102. It projects through an opening 110 located within the central portion of the contact arm 62 through the center of a bearing retainer ring 112 secured to this contact arm. Between the shaft 106 and the ring 112 conventional ball bearings 114 are positioned to support this shaft. A retaining washer 116 held in place about the shaft 106 by a nut 118 is used for the obvious purpose of preventing the bearings 114 from moving out of the retaining ring 112.

The bellows 94 is provided with an attaching boss 120 in which there is located a central opening 122 carrying the end of the shaft 96 remote from the contact arm 62. A screw 124 is employed for the obvious purpose of holding this shaft 96 within the opening 122. During expansion of the bellows 94 the boss 120 is designed to hit upon a ferrule 126 of a non-conductive material disposed about the shaft 96 upon a supporting structure 128 located transversely to the shaft 96. This supporting structure is indicated best in Fig. 4 of the drawings and incorporates a screw 130 which may be employed so as to adjust the position of the ferrule 126 as desired. The supporting structure includes arms 132 attached by screws 134 to legs of a generally cylindrical cage-like bellows mounting support 136 which is located within the housing 12 so as to be secured to the mounting member 40 by means of screws 139. Upon the support 136 there is located by means of screws 140 a generally disc-shaped carrier member 142 formed of a non-conductive material having a central opening 144 around which there is formed an annular shoulder 146. Positioned within this opening 144 is a nut 148 having a shoulder 150 engaging the shoulder 146 so that movement of the nut 148 toward the lid 16 is prevented. This nut 148 carries a threaded shaft 152 projecting from the bellows 94 on the side thereof remote from the ferrule 126 in such a manner that, as the nut 148 is turned, the shaft 152 may be drawn into this nut adjusting the position of the bellows 94 so that the contacts 70 are positioned upon the resistance element 76 in a desired location. A screw 154 is provided in the carrier member 142 in order to prevent undesired rotation of the nut 148 once such an adjustment has been achieved.

The effectiveness of this adjustment depends in a large part upon the operation of a spring 156 secured about the shaft 152 so as to bias the bellows 94 away from the carrier 142. This spring 156 includes, as is shown in Fig. 5, a plurality of resilient arms 158 normally engaging the carrier member 142 and a central portion 160 having the general shape of a washer located about the shaft 152 so as to be secured to the bellows 94. Normally in commercial practice this bellows includes a rigid internal member (not shown) attached to the shaft 152 against which the central portion 160 bears. Small projections 162 formed upon the carrier member 142 are employed to engage at least one of the arms 158 in order to prevent rotation of the entire bellows 94 during the adjustment of the nut 148. The precise arrangement for holding the bellows 94 described is very effective since it permits a great deal of adjustment of the bellows during the assembly of the resistor 10. Further this arrangement is desirable inasmuch as with it the bellows 94 is effectively placed so as to be insulated from all parts of the unit except the contact arm 62.

The operation of the pressure sensitive resistor 10 is essentially identical to the operation of similar units disclosed in the copending application mentioned at the start of this specification. The bellows 94 are normally manufactured so as to be in a collapsed condition. Thus, as gas is introduced into or removed from the housing 12 through a tapped opening 164 formed within the lid 16 past a filter screen 166, the bellows 94 expand or contract moving the contacts 70 along the resistance element 76. This in turn effects the electrical signal transmitted through the wires 78 and 90. These wires are preferably passed through the opening 42 in the mounting member 40 into an internal groove 168 formed in the lid 16 where they are attached to conventional terminals 170 passing through this lid.

As the resistor 10 is operated under conditions where this resistor is subjected to frequent vibration, or oscillation unwanted vibration of the complete bellows 94 and the attached movable parts may occur which will tend to destroy the accuracy of the instrument. The total mass of all the movable parts within the resistor 10 apparently operates so as to have a resonant frequency at which their vibration or oscillation is exceedingly pronounced. An important part of the present invention is the discovery of means for compensating for this unwanted vibration so that resistors of the type herein described can be operated with substantially constant accuracy when subjected to vibration of widely different frequency.

In the resistor 10 shown in Figs. 1 through 5 of the drawings balancing means 172 are provided in order to accomplish this end result. The balancing means 172 includes a screw 174 passing through a threaded opening 176 within the shaft 50 and an opening within a cross-member 178 which is secured to this screw 174 by the walls of the cross-member projecting into a groove (not shown) within the screw 174 adjacent to the head thereof. By virtue of this construction the cross-member is incapable of lateral movement with respect to the screw 174. Rigidly secured to the cross-member 178 are flexible rods 180 which project through openings 182 in the shaft 50 so as to terminate immediately adjacent to the resistance support 46 where they are secured to a weight 184. Thus with this construction the position of the weight 184 and the cross-member 178 with respect to the shaft 50 may be adjusted by merely turning this screw 174. The screw 174, the cross-member 178, and the portions of the rod 180 located on the side of the shaft 50 adjacent to this cross-member 178 constitute what may be termed a static balance which serves to effectually distribute the load of the movable parts carried by the bearing support 44 so that these movable parts rotate freely. These parts do not vibrate with respect to the shaft 50 during the operation of the resistor 10. The weight 184 and the portions of the rods 180 on the side of the shaft adjacent to this weight constitute what may be termed dynamic balancing means which when properly adjusted with respect to the shaft 50 serve to dampen or otherwise modulate undesired vibration of the movable parts within the resistor 10. Such adjustment is best carried out after assembly of all operating parts. The precise method in which the dynamic balancing means function in this regard is not completely understood at the present time. However it is believed that the mass of the dynamic balancing means serve to vibrate with respect to the shaft 50 and the parts attached thereto at the same frequency of oscillation as the mass of the movable parts within the resistor so as to effectively nullify the oscillation or vibration of the movable parts. This action may be termed as occurring at the resonant frequency of the mass of these movable parts.

In Fig. 7 of the drawings a modified construction is shown which differs from the construction illustrated in the other figures of the drawings solely in that the static balancing means indicated in the preceding discussion are omitted, and in that dynamic balancing means of a different structure are employed. These dynamic balancing means consist of two flexible rods 186 projecting from the shaft 50 so as to carry a weight 188 at a point remote from this shaft. By proper adjustment of the weight position upon these rods it is possible to secure the same vibration dampening results achieved with the construction described in the preceding. Such adjustment is preferably carried out after the assembly of the complete unit using appropriate equipment to vibrate these parts at various frequencies.

Those skilled in the art will realize that a number of minor modifications may be made in the structure shown without departing from the essential teachings of this specification. All such modifications are to be considered as part of the invention insofar as they are defined by the appended claims. Those familiar with the art will also realize that a number of specific features of the invention, as set forth in certain of the following claims, are of substantial utility in other instruments besides the precise responsive resistors shown.

We claim:

1. In a device having movable parts attached to a rotatable shaft, a construction for dampening unwanted vibration which comprises: resilient arm means extending from said shaft; and weight means mounted on said resilient arm means, said arm means and said weight means being positioned with respect to said shaft so that said weight means will serve as a dynamic counterbalance capable of vibrating with respect to said shaft in order to dampen undesired vibration.

2. In a device having movable parts attached to a rotatable shaft, a construction for dampening unwanted vibration which comprises: resilient arm means extending from said shaft; and weight means adjustably mounted on said resilient arm means so that the position of said weight means with respect to said shaft may be adjusted so that said weight means will serve as a dynamic counterbalance capable of vibrating with respect to said shaft in order to dampen undesired vibration.

3. In a device having movable parts attached to a rotatable shaft, a construction for dampening unwanted vibration which comprises: resilient arm means extending from said shaft; means for moving said resilient arm means with respect to said shaft; and weight means secured to said resilient arm means so that the position of said weight means may be adjusted with respect to said shaft so that said weight means will serve as a dynamic counterbalance capable of vibrating with respect to said shaft in order to dampen undesired vibration.

4. In an electrical device of the class described, a construction which comprises: a rotatable shaft; a rigid member secured to said shaft so as to project therefrom; resilient arm means operatively secured to said rigid member so as to project therefrom; and weight means secured to said resilient arm means, said weight means being capable of vibrating with respect to said shaft in order to dampen undesired vibration affecting the movement of said shaft.

5. A locking construction which comprises: a cylindrical member having an open end; means defining a groove in the exterior of said cylindrical member adjacent to and spaced from said open end, said groove projecting entirely around said cylindrical member; a recessed portion on the exterior of said cylindrical member extending between said groove and said open end entirely around said cylindrical member, said recessed portion being of smaller diameter than the exterior diameter of said cylindrical member; a second member fitting within said open end of said cylindrical member; means defining a recessed portion in said second member adjacent to said open end, said recessed portion passing completely around said second member; a ring having a transverse opening therein and interior projections formed thereon and having exterior diameter the same as the diameter of said cylindrical member positioned around said cylindrical member and said second member with said projections fitting into said groove and said recessed portion of said second member, said ring forming a continuous exterior surface coplanar with the exterior surface of said cylindrical member.

6. A pressure responsive electrical instrument which includes: a housing; bellows means mounted within said housing; shaft means attached to said bellows means so as to project therefrom; electrically conductive means positioned within said housing; bearing means positioned within said housing; a shaft rotatably held by said bearing means; an arm secured to said shaft so as to project therefrom; means coacting with said electrically conductive means mounted on said arm whereby during movement of said bellows means said means coacting with said electrically conductive means are moved with respect to said electrically conductive means; resilient arm means extending from said shaft; weight means mounted on said resilient arm means, said weight means being capable of vibrating during operation of said instrument so as to dampen unwanted vibrations.

7. A pressure responsive resistor which includes: a closed housing; a bellows having a first shaft projecting from one side thereof and a second shaft projecting from the other side thereof positioned within said housing; means located in said housing for holding said first shaft in a fixed position within said housing so as to mount said bellows; a third shaft rotatably mounted within said housing; an arm attached to said third shaft so as to project therefrom, said second shaft being attached to said arm at a point remote from said third shaft whereby as said bellows expands and contracts the motion of said bellows is transmitted by said second shaft to said arm causing said arm to move within said housing; an arcuate electrical resistance element positioned within said housing adjacent to said arm; contact means attached to said arm so as to engage said resistance element during movement of said arm; resilient arm means extending from said third shaft; and weight means mounted on said resilient arm means, said weight means being capable of vibrating during operation of said resistor so as to dampen unwanted vibrations.

8. A pressure responsive resistor which includes: a cylindrical housing having an open end and a closed end; means defining a groove in the exterior of said cylindrical housing adjacent to and spaced from said open end, said groove projecting entirely around said cylindrical housing; a recessed portion on the exterior of said cylindrical housing extending between said groove and said open end entirely around said cylindrical housing, said recessed portion being of smaller exterior diameter than the exterior diameter of said cylindrical housing; a lid positioned within said open end of said cylindrical housing so as to extend therefrom; means defining a second groove in said lid adjacent to said open end, said second groove passing completely around said lid; a ring having a transverse opening therein and interior projections formed thereon and having an exterior diameter the same as the diameter of said cylindrical housing positioned around said cylindrical housing and said lid with said projections fitting into said grooves, said ring forming a continuous exterior surface coplanar with the exterior surface of said cylindrical housing; a bellows mounting support attached to said lid within said housing; a carrier member attached to said bellows mounting support; means defining a central opening around which there is an annular shoulder in said carrier member; a nut having a shoulder positioned within said carrier member so that said shoulder engages said annular shoulder; a threaded shaft carried by said nut so as to project therefrom; means for preventing rotation of said nut; a bellows secured at its center to said threaded shaft; spring means located around said threaded shaft so as to engage said bellows member, said spring means including portions resiliently engaging said mounting member; a second shaft projecting from said bellows on the side thereof remote from said threaded shaft; a third shaft rotatably mounted upon said lid within said housing; an arm secured to said third shaft so as to project therefrom; bearing means connecting said second shaft and said arm at a point removed from said third shaft; an arcuate resistance element mounted upon said lid within said housing; contact means engaging said resistance element attached to said arm; electrical means including terminal means operatively connected to the ends of said resistance element and to said contact means; resilient arm means extending from said third shaft; and weight means mounted on said resilient arm means.

References Cited in the file of this patent
UNITED STATES PATENTS

| | | |
|---|---|---|
| 1,804,953 | Roller | May 12, 1931 |
| 2,443,252 | Kelly | June 15, 1948 |
| 2,466,071 | Barnes et al. | Apr. 5, 1949 |
| 2,543,228 | Burgess | Feb. 27, 1951 |
| 2,551,989 | Wilson | May 8, 1951 |
| 2,622,177 | Klose | Dec. 16, 1952 |
| 2,704,316 | De Bell | Mar. 15, 1955 |